United States Patent
Freshour et al.

(10) Patent No.: US 6,299,780 B1
(45) Date of Patent: Oct. 9, 2001

(54) METHOD FOR TREATMENT OF SILICONE EMULSION WASTE BY CHEMICAL ADDITION

(75) Inventors: Amy Rene Freshour, Putte (NL); Bang Mo Kim; Roy Fred Thornton, both of Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/467,565

(22) Filed: Dec. 20, 1999

(51) Int. Cl.[7] .............................. B01D 17/04; C02F 1/52
(52) U.S. Cl. ................. 210/708; 210/712; 210/723; 210/737; 516/138
(58) Field of Search ................................ 516/138, 139; 210/708, 710, 712, 723, 737

(56) References Cited

U.S. PATENT DOCUMENTS

| | | | |
|---|---|---|---|
| 3,732,163 | * 5/1973 | LApidot | 210/760 |
| 3,855,124 | * 12/1974 | Lapidot | 210/760 |
| 4,313,824 | * 2/1982 | Huss et al. | 210/86 |
| 4,313,833 | * 2/1982 | West | 210/195.1 |
| 5,271,851 | 12/1993 | Nelson et al. | 210/770 |
| 5,288,391 | 2/1994 | Biceroglu | 208/13 |
| 5,905,183 | * 5/1999 | White et al. | 210/710 |
| 5,910,234 | * 6/1999 | Mautner et al. | 210/724 |

OTHER PUBLICATIONS

Shugar et al., Chemical Technician's Ready Reference Handbook, Second Edition, (McGraw–Hill Book Company, NY, NY, copyright 1987) pp. 311–312.*

* cited by examiner

Primary Examiner—Daniel S. Metzmaier
(74) Attorney, Agent, or Firm—Bernadette M. Bennett; Noreen C. Johnson

(57) ABSTRACT

A method for treating silicone emulsion waste includes the steps of adding base chemical materials to the silicone emulsion waste in an amount effective to cause separating of the silicone emulsion waste. The added chemicals separate the silicone emulsion waste into silicone oil and an emulsion-free water. The components can be separated, with the silicone oil laden liquid being recycled and the emulsion-free water being sent to a wastewater treatment plant. The base chemicals can include sodium hydroxide, sodium carbonate, sodium chloride and/or combinations thereof. To enhance separating of the silicone emulsion waste, the silicone emulsion waste can be heated prior to the addition of the chemicals. Also, by recycling the treated water and adding the same to the silicone emulsion waste and base chemicals separation of the silicone emulsion waste can be enhanced.

17 Claims, 3 Drawing Sheets

METHOD FOR TREATMENT OF SILICONE EMULSION WASTE BY CHEMICAL ADDITION

BACKGROUND OF THE INVENTION

The invention relates to a method for the treatment of wastes containing silicone emulsions for separating silicone oil and water from the wastes. In particular, the invention relates to a method for separating the emulsion by the addition of chemicals, such as, but not limited to, sodium hydroxide, sodium carbonate, and sodium chloride, or combinations of these chemicals, to produce two separate phases containing silicone oil and water.

FIG. 1 schematically illustrates a prior system for silicone treatment. In FIG. 1, silicone emulsions are produced in a batch method, such as, but not limited to, making a surfactant blend containing different types and concentrations of emulsifiers and biocides. The surfactant blend is mixed with silicone oil to form a surfactant paste. Next, the surfactant paste is diluted with water to form emulsion products. A majority of the waste is generated when mixing vessels and lines are cleaned for transition to a different silicone emulsion grade product.

A current practice for cleaning the tanks and lines includes washing mixing tanks and lines in cleaning stages. In the first cleaning stage, the tanks are filled to approximately ⅓ of their capacity, and the wash water is recirculated throughout the tanks and lines. This wash water, which contains the majority of the emulsions, is mixed with other wastes, and can be burned in an incinerator. The cost of running an incinerator, which burns mostly water, is high, and often the wash water load to the incinerator exceeds its capacity. However, subsequent washes contain very little emulsions, and can be sent directly to a wastewater treatment plant (WWTP).

Presently, chemicals are available that can be used to break or separate emulsions. The choices of chemicals depend on the specific compositions of the emulsions containing wastes. There are several commercially available emulsion separators. In testing, some cationic surfactants, such as Atlas-G265 and G250, manufactured by ICI Surfactants®, failed to adequately separate the emulsion. Likewise, Triton X-50 manufactured by Union Carbide® and sodium dodecylbenzene sulfonic acid could not adequately separate the silicone emulsions.

Other general types of emulsion separators that were tested for their ability to separate the silicone emulsion include quaternary polyamide, polyamide polymer, aluminum salts, ferric sulfate, polyquaternary ammonium chloride, polyamine, and a sodium aluminate solution which contains 20–40% sodium aluminate and 5–10% sodium hydroxide. All of these, except sodium aluminate, failed to adequately separate the silicone emulsion. However, to separate the emulsion, 13% volume basis of sodium aluminate solution must be added. This value may be too high and may result in a costly method.

Therefore, a need exists to develop effective methods for separating silicone oil and water from emulsion wastes and to reduce the cost associated with the disposal of such wastes.

SUMMARY OF THE INVENTION

One aspect of the invention provides chemicals, such as sodium hydroxide, sodium chloride, sodium carbonate and/or a combination thereof, to separate the emulsions and separate the emulsions into silicone oil and water. Another aspect of the invention enhances emulsion separating by heating the emulsion prior to the addition of the chemicals.

Still another aspect of the invention reduces the amount of chemicals to separate the emulsion by recovering recycled water and including the recovered water in the method, as embodied by the invention.

According to an embodiment, a method for treating silicone emulsion wastes includes the steps of adding base chemical materials to the emulsion waste in an amount effective to cause separating of the waste. The added chemicals separate the emulsion wastes into silicone oil laden liquid and emulsion-free water. The components can be separated, with the silicone oil laden liquid being sent to an incinerator and the emulsion-free water being recycled in a waste water treatment plant.

BRIEF DESCRIPTION OF THE DRAWINGS

Other features and advantages of the invention will become apparent from the following description of embodiments of the invention, which refers to the accompanying drawings, wherein.

DETAILED DESCRIPTION OF THE INVENTION

A silicone emulsion typically comprises a mixture of silicone oil and water, which can be stabilized by a surfactant blend. The surfactant blend comprises a combination of at least one of nonionic, anionic, and cationic surfactants. Waste from the production of silicone emulsions can comprise approximately 50% of waste from the method that is sent to an incinerator. This stream can be intercepted before mixing and combined with other materials, so that water can be removed. Thereby, the wastewater load that is sent to the incinerator can be reduced.

Figure 1:
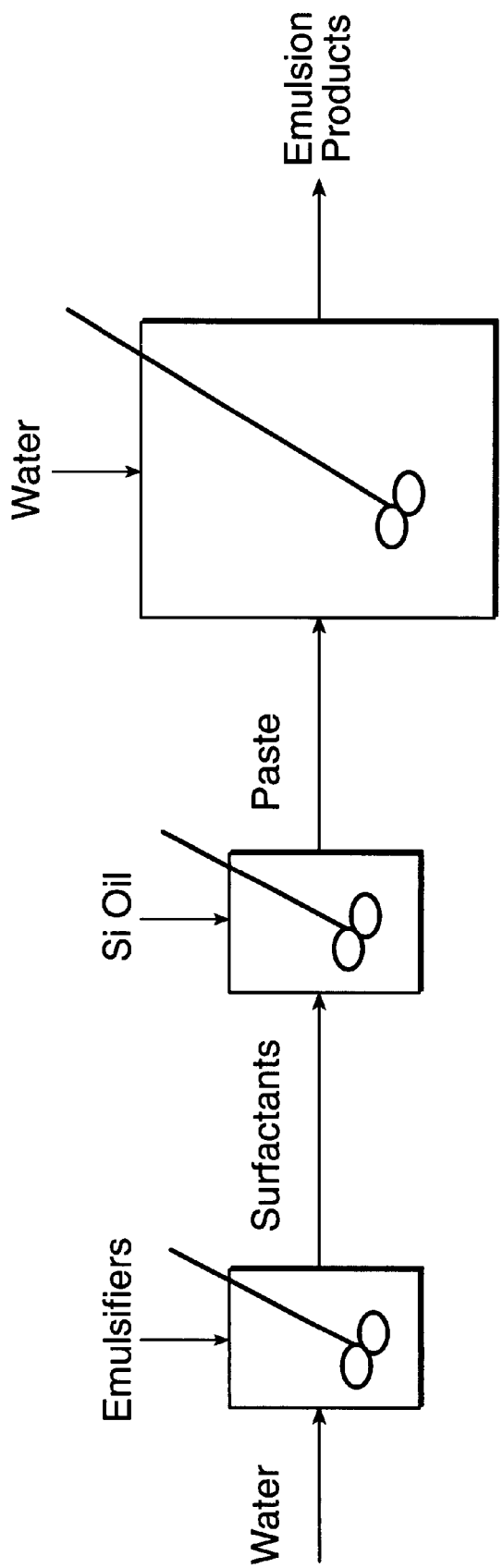
FIG. 1 is a schematic perspective view of a known method for producing silicone emulsions.
Figure 2:
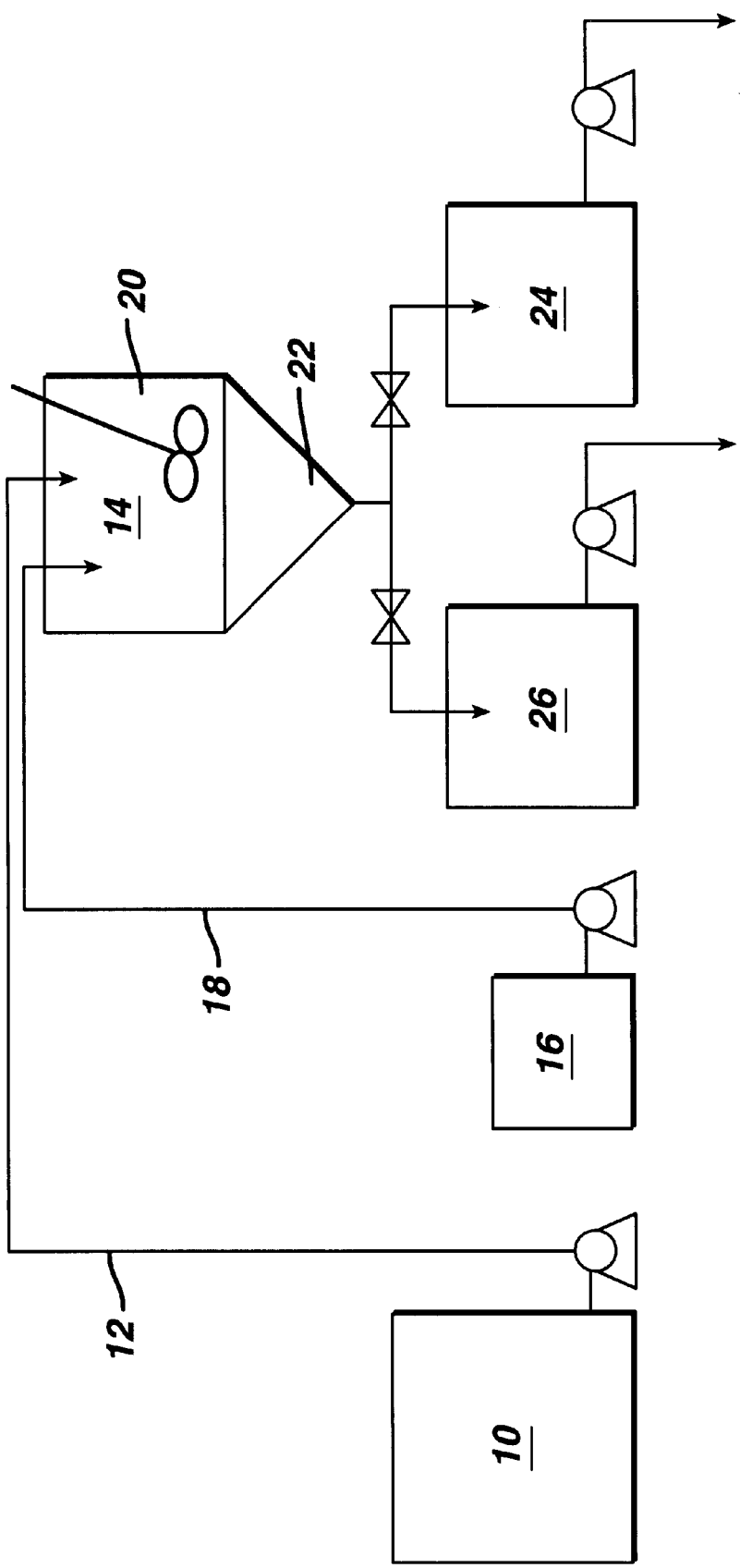
FIG. 2 is a schematic perspective view of a treatment method, as embodied by the invention.

FIG. 2 is a schematic perspective view of a treatment method, as embodied by the invention. In FIG. 2, the silicone emulsion waste can be separated by adding chemicals in an amount that is effective to separate the silicone emulsion waste. The silicone emulsion waste in reservoir 10 can be fed via conduit 12 to mixing tank 14.

Chemical materials for separating the silicone emulsion waste are contained in a separate tank 16. These chemicals can be pumped from the tank 16 to a mixing tank 14 via a conduit 18. In mixing tank 14, when separated, the remaining emulsion or silicone oil 20 will float on top of the emulsion-free water 22, which can be easily separated. The emulsion-free water 22 can be drained to a water tank 24. The silicone oil 20 can be transferred to an oil tank 26. The silicone oil 22 can be recycled or incinerated. The emulsion-free water 22 can be recovered from the emulsion by separating, and can be discharged to a wastewater treatment plant.

A series of experiments were performed to determine the appropriate chemicals for separating the silicon emulsions. In the following description, the values are approximate, unless otherwise specified. The term "base material" means a basic compound or admixture that has a pH level in a range between about 9 to about 14. For example, base materials such as, but not limited to, 8% NaOH or 8% $Na_2CO_3$ are effective base material, as embodied by the invention.

A suitable range of sodium hydroxide mixed with the silicone waste emulsion is in an amount from about 8 to about 12%. Also, a suitable range of sodium hydroxide mixed with the silicone waste emulsion is in an amount from about 3 to about 8%. A suitable range of sodium carbonate mixed with the silicone waste emulsion is in an amount from about 3 to about 10%.

The amount of base materials can be reduced by mixing NaOH and $Na_2CO_3$ with NaCl. For example, but not limited to, a mixture of 6% NaCl with 4% $Na_2CO_3$ or 0.5% NaOH is effective to reduce the amount of base material, as embodied by the invention. Further, an increase in temperature, for example, heating the emulsion to 75° C., enhanced emulsion separating. Increasing the temperature further, such as, above 80° C., combined with the addition of NaCl may also be effective to separate emulsions. Also, use of the water recovered by the treatment can reduce the addition of chemicals.

In the experiments, several silicon emulsion samples were obtained and diluted with distilled water, thus simulating dilution that occurs during the washing or cleaning at a silicone manufacturing plant. The type of surfactant varied for different emulsion grades. The resulting silicone emulsion wastes are indicated by Samples 1–8, and contained silicone oil in a range from about 4.5 to about 10% and with total surfactants in a range from about 0.3% to about 1.03%, as listed in Table I.

TABLE I

| Sample | % Si Oil | % Total Surfactants |
|--------|----------|---------------------|
| 1 | 4.5 | 0.59 |
| 2 | 5.6 | unknown |
| 3 | 6.5 | 0.76 |
| 4 | 6.5 | 0.54 |
| 5A | 6.5 | 0.67 |
| 5B | 7.5 | 0.77 |
| 6 | 9.0 | 0.30 |
| 7 | 9.0 | 0.41 |
| 8 | 1o.0 | 1.03 |

Advantages of the method, as embodied by the invention, are discussed in the following examples of the method, as embodied by the invention.

EXAMPLE 1

A 10 milliliter (ml) aliquot was taken from each of the nine samples, which are listed above in Table I. At room temperature (25° C.), sodium hydroxide (NaOH) in pellet form was mixed into each sample until a separation in the silicone emulsion waste was visibly detected. The experiments were repeated with the 10 ml aliquots preheated to 75° C. before adding the NaOH. The results are listed in Table II. The percent NaOH for separation of the silicone emulsion waste is based on a mass of NaOH added per mass of the aliquot.

TABLE II

| | Approximate % NaOH Added | |
|---|---|---|
| Sample | 25° C. | 75° C. |
| 1 | 10 | 7 |
| 2 | 10 | 3 |
| 3 | 11 | 4 |
| 4 | 11 | 3 |
| 5A | 9 | 7 |
| 5B | 11 | 8 |
| 6 | 12 | 5 |
| 7 | 10 | 4 |
| 8 | N/A | 4 |

The experiment illustrates that NaOH can be used to separate various silicone emulsion wastes. It also either that a lower amount of NaOH may be needed to separate the silicone emulsion waste when the silicone emulsion waste is provided at a higher temperatures.

EXAMPLE 2

Silicone emulsion waste separating was attempted with sodium carbonate ($Na_2CO_3$) in this Example because the cost of NaOH is high. A 10 ml aliquot was taken from each sample. At 75° C., $Na_2CO_3$ (25% solution) was mixed into each sample until a separation in the silicone emulsion waste was visibly detected. The percent $Na_2CO_3$ needed to separate the silicone emulsion waste can be based on a mass of $Na_2CO_3$ added per mass of the aliquot.

TABLE III

| Sample | Approximate % $Na_2CO_3$ Added |
|--------|-------------------------------|
| 1 | 5.5 |
| 2 | 3.4 |
| 3 | 4.2 |
| 4 | 6.8 |
| 5A | 6.0 |
| 6 | 6.9 |
| 7 | 5.8 |
| 8 | 3.8 |

The results listed in Table III illustrate that approximately the same amount of sodium carbonate can separate the silicone emulsion waste in a similar effectiveness as sodium hydroxide at 75° C.

EXAMPLE 3

Figure 3:
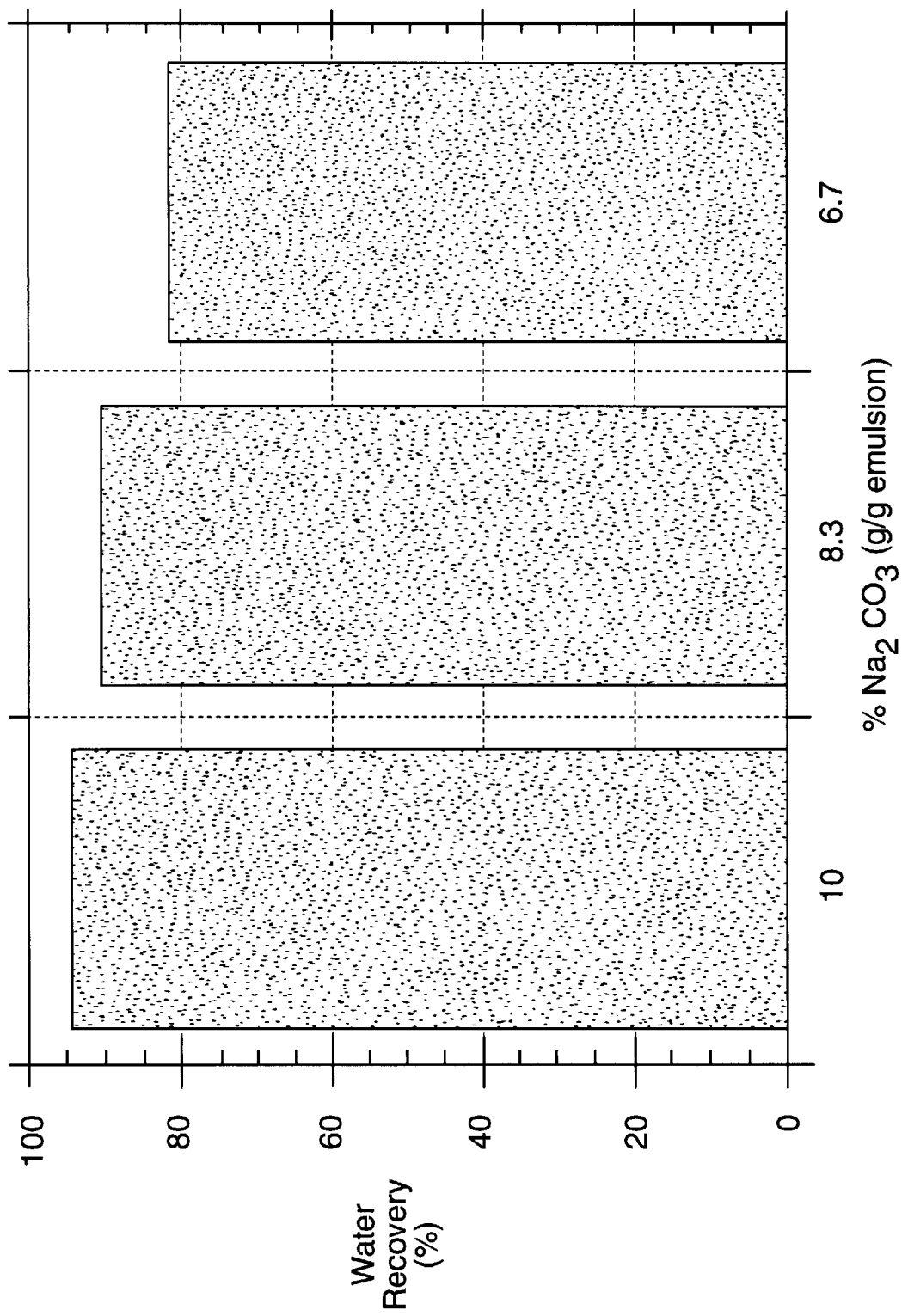
FIG. 3 is a plot of water recovered percentage of as a function of percentage of sodium carbonate added, as embodied by the invention.

A 20 ml sample was taken from Sample 1 and heated to 75° C. Powder $Na_2CO_3$, which corresponds to 6.7% (mass $Na_2CO_3$/mass silicone emulsion waste) was added. The silicone emulsion waste was allowed to separate and the emulsion-free water was drained. The water recovery was calculated based on the total amount of water in the silicone emulsion waste. The experiment was repeated with 8.3% and 10% $Na_2CO_3$ added. As illustrated in FIG. 3, the water recovery increases as the amount of added $Na_2CO_3$ increases. At 10% $Na_2CO_3$, approximately 95% water can be recovered.

EXAMPLE 4

A mixture of silicone emulsion wastes was made using equal amounts of samples 1, 4, and 6, above. Experiments were conducted with 20 ml aliquots heated ton 75° C. In the first experiment, powder $Na_2CO_3$ was added until greater than 90% water recovery was achieved. This value corresponded to 8.5% $Na_2CO_3$. For the second experiment, sodium chloride (NaCl) ions equal to ions from 8.5% $Na_2CO_3$ were added. The corresponding amount of $Na_2CO_3$ that is added to achieve at least 90% water recovery is 4.7%. Similarly, the experiment was repeated using $Na_2CO_3$ as a base material. When the same amount of salt was added, 0.5% $Na_2CO_3$ is needed to completely separate the mixture of silicone emulsion wastes. These results can be reproduced using a mixture of silicone emulsion waste samples 2, 4, 5A, and 8.

These results indicate that $Na_2CO_3$ or NaOH in the method, as embodied by the invention, may be reduced by adding NaCl. Cost analysis shows that savings can be made by using low salt and low base material amounts.

EXAMPLE 5

A mixture of silicone emulsion wastes was made that comprises of equal parts of Samples 2, 4, and 8, and a half part of Sample 5A. Experiments were conducted with 20 ml aliquots heated to 75° C. Salt (NaCl) was added in varying amounts, and the mixture was heated until the silicone emulsion waste was completely separated.

The results are listed in Table IV illustrate that NaCl can be used alone to separate the silicone emulsion wastes, however, slightly higher temperatures may need to be reached. Other tests illustrated that salt concentrations greater than 7% had little if any effect on the separating temperature.

TABLE IV

| % NaCl | Separate Temperature (E C) |
|--------|----------------------------|
| 3      | 93                         |
| 5      | 91                         |
| 6      | 84                         |
| 7      | 81                         |

EXAMPLE 6

Using the same mixture of silicone emulsion wastes in Example 4, 20 ml of silicone emulsion wastes was separated with 1.71 g $Na_2CO_3$ at 75° C. (Experiment A). 10 ml of treated water from Experiment A was added to 20 ml of the mixture of silicone emulsion wastes (Experiment B). At 75° C., the silicone emulsion wastes of Experiment B did not separate, so $Na_2CO_3$ was added. Only 0.48 g of $Na_2CO_3$ was needed to completely separate the silicone emulsion waste. Further, 10 ml of treated water from Experiment B was added to 20 ml of the mixture of silicone emulsion wastes (Experiment C). This addition alone did not separate the silicone emulsion waste, and $Na_2CO_3$ was added. 1.79 g of $Na_2CO_3$ was added to separate the silicone emulsion waste. The test results indicate that recycling the treated water back to the method, as embodied by the invention, can decrease the chemical materials' requirement. However, the additional chemical materials' requirement surpasses the original requirement as water recycling is continued. This result can be possibly due to surfactant build-up in the water.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for treatment of a surfactant stabilized silicone oil emulsion waste which comprises breaking the surfactant stabilized silicone oil emulsion waste by a process comprising admixing the waste emulsion with a base chemical material comprising a basic compound or admixture that has a pH level between about 9 to about 14, in an amount sufficient to break the waste emulsion into a silicone oil laden liquid phase and an emulsion-free water phase, separating the resulting silicone oil laden liquid phase and the emulsion-free water phase, and further comprising the step of recycling the silicone oil laden liquid.

2. The method according to claim 1, wherein the step of adding chemical base material comprises mixing sodium hydroxide with the silicone emulsion waste.

3. The method according to claim 2, wherein sodium hydroxide is mixed with the silicone emulsion waste in an amount in a range from about 8 to about 12% sodium hydroxide, said range based on the mass of sodium hydroxide per mass of silicone emulsion waste.

4. The method according to claim 2, further comprising the step of heating the silicone emulsion waste prior to the step of adding base chemical material.

5. The method according to claim 4, wherein sodium hydroxide is mixed with the silicone emulsion waste in an amount in a range from about 3 to about 8% sodium hydroxide, said range based on the mass of sodium hydroxide per mass of silicone emulsion waste.

6. The method according to claim 2, wherein the step of adding chemical base material comprises adding sodium chloride with the sodium hydroxide.

7. The method according to claim 6, wherein the sodium chloride is added to the silicone emulsion waste in a larger amount than the sodium hydroxide.

8. The method according to claim 1, wherein the step of adding chemical base material comprises mixing sodium carbonate with the silicone emulsion waste.

9. The method according to claim 8, further comprising the step of heating the silicone emulsion waste prior to adding the base chemical material.

10. The method according to claim 9, wherein the sodium carbonate is mixed in an amount in a range from about 3 to about 10% sodium carbonate, said range based on the mass of sodium carbonate per mass of silicone emulsion waste.

11. The method according to claim 8, wherein the step of adding the chemical base materials comprises adding sodium chloride with the sodium carbonate.

12. The method according to claim 11, wherein the sodium chloride is added to the silicone emulsion waste in a amount greater than the amount of sodium carbonate.

13. The method according to claim 12, wherein the silicone emulsion waste is heated to above 80° C.

14. The method according to claim 1, wherein the silicone emulsion waste is heated to at least 75° C.

15. The method according to claim 1, further comprising the step of treating the emulsion-free water at a waste water treatment plant.

16. The method according to claim 15, further comprising the step of recycling the emulsion-free water.

17. The method according to claim 16, further comprising the step of adding the recycled treated emulsion-free water to the silicone emulsion waste and chemical base material.

\* \* \* \* \*